United States Patent [19]
Kramer

[11] Patent Number: 5,568,585
[45] Date of Patent: Oct. 22, 1996

[54] LOW-TEMPERATURE HERMETIC SEALING OF OPTICAL FIBER COMPONENTS

[75] Inventor: Daniel P. Kramer, Centerville, Ohio

[73] Assignee: The United States of America as represented by the Department of Energy, Washington, D.C.

[21] Appl. No.: 403,019

[22] Filed: Mar. 13, 1995

[51] Int. Cl.⁶ .................................................. G02B 6/00
[52] U.S. Cl. .............................................. 385/139; 385/147
[58] Field of Search ................................. 385/139, 140, 385/147, 88, 89, 93

[56] References Cited

U.S. PATENT DOCUMENTS

| | | | |
|---|---|---|---|
| 4,119,363 | 10/1978 | Camlibel et al. | 350/96.2 |
| 4,536,203 | 8/1985 | Kramer | 65/29 |
| 4,612,029 | 9/1986 | Kramer et al. | 65/59.24 |
| 4,617,044 | 10/1986 | Kramer et al. | 65/49 |
| 4,705,585 | 11/1987 | Kelly et al. | 156/89 |
| 5,061,035 | 10/1991 | Rogers, Jr. | 385/115 |
| 5,143,531 | 9/1992 | Kramer | 65/3.11 |
| 5,155,795 | 10/1992 | Wasserman et al. | 385/138 |
| 5,164,999 | 11/1992 | Shifflett | 385/12 |
| 5,337,387 | 8/1994 | Kramer | 385/76 |

*Primary Examiner*—Akm E. Ullah
*Attorney, Agent, or Firm*—Russell D. Elliott; James H. Chafin; William R. Moser

[57] ABSTRACT

A method for manufacturing low-temperature hermetically sealed optical fiber components is provided. The method comprises the steps of: inserting an optical fiber into a housing, the optical fiber having a glass core, a glass cladding and a protective buffer layer disposed around the core and cladding; heating the housing to a predetermined temperature, the predetermined temperature being below a melting point for the protective buffer layer and above a melting point of a solder; placing the solder in communication with the heated housing to allow the solder to form an eutectic and thereby fill a gap between the interior of the housing and the optical fiber; and cooling the housing to allow the solder to form a hermetic compression seal between the housing and the optical fiber.

18 Claims, 1 Drawing Sheet

LOW-TEMPERATURE HERMETIC SEALING OF OPTICAL FIBER COMPONENTS

GOVERNMENT RIGHTS

The United States Government has rights in this invention pursuant to Contract No. DE-AC04-88DP43495 between the U.S. Department of Energy (DOE) and EG&G Mound Applied Technologies.

BACKGROUND OF THE INVENTION

1. Field of the Invention

The present invention relates generally to hermetically sealed fiber optic components, and more particularly to a method of manufacturing low-temperature hermetically sealed optical fiber components.

2. Description of the Prior Art

Recent developments in optical communications have generated a need for special devices which require a hermetic housing to protect the optical devices from contamination by elements in the outside atmosphere such as moisture. Inasmuch as optical signals exit or enter the hermetic housing via optical fibers 10, some means to hermetically seal fiber 10 to the housing is required. For most applications, a satisfactory seal should be inexpensive and reliable, and optical fiber 10 should undergo no significant change in optical or mechanical properties due to the construction of the seal.

FIG. 1 illustrates a schematic of a typical plastic-buffered glass core/clad optical fiber 10 which represents the vast majority of optical fibers presently being commercially produced. It consists of a glass core 12 which is surrounded by a glass cladding 14. The index of refraction difference between the two glasses 12 and 14 allows optical fiber 10 to transmit light with minimal losses. A plastic buffer 16 is placed on the surface of glass cladding 14 immediately after its fabrication. Plastic buffer 16 is required to protect glass cladding 14 from abrasion and moisture since the tensile strength of a glass fiber is dependent on minimizing the formation of surface flaws. Any abrasion of glass cladding 14 will greatly decrease the fiber's strength and its ultimate utility. Moisture is also detrimental to the tensile strength of optical fiber 10 since water can exaggerate surface flaws and also lower the tensile strength of optical fibers 10. These are the principal reasons why plastic buffer 16 is used to coat optical fibers 10. Any removal of plastic buffer 16 results in an optical fiber 10 that is very vulnerable to breakage and failure.

In prior art processes, the hermetic seal was formed onto a bare glass fiber 10 or a metal (gold)-coated optical fiber 10 using a high-temperature braze or sealing glass at a temperature greater than almost 800° C.

For example, U.S. Pat. No. 4,119,363, by Camlibel et al., discloses a technique for forming a hermetic seal between bare optical fiber and a low melting metal. As stated above, bare fibers are susceptible to moisture and scratching as well as being mechanically weak. It should be appreciated that optical devices which may be handled roughly or may be subjected to mechanical loads require fibers which are mechanically strong. Finally, the seal which results from the Camlibel et al. disclosure does not result in a chemical bond.

SUMMARY OF THE INVENTION

It is therefore an object of the present invention to provide an innovative low-temperature process, less than about 200° C., which results in the formation of hermetic seals between a metal component: and a plastic-buffered, bare, or metal-coated optical fiber. The principal advantage of the development described in this disclosure is that the low temperature utilized during seal formation greatly enhances its application.

It is a further object to provide a hermetic seal having a high strength optical fiber.

It is yet another object to provide a hermetic seal wherein the plastic buffer, disposed around the optical fiber is undisturbed and thereby allowing the plastic buffer to add strength and protect against moisture damage to the optical fiber.

It is yet another object to provide a hermetic seal which is formed by a compressive seal between the optical fiber and a housing.

It is yet another object to utilize a fused fiber array in conjunction with a low temperature hermetically sealed component.

Finally, it is an object of the invention to provide a hermetic seal which is formed by both a compressive seal and a chemical bond between the optical fiber and the housing.

According to one broad aspect of the present invention, there is provided a method for manufacturing low-temperature hermetically sealed optical fiber components. The method comprising the steps of: inserting an optical fiber into a housing, the optical fiber having a glass core, a glass cladding and a protective buffer layer disposed around the core and cladding; heating the housing to a predetermined temperature, the predetermined temperature being below a melting point for the protective buffer layer and above a melting point of a solder; placing the solder in communication with the heated housing to allow the solder to form an eutectic and thereby fill a gap between the interior of the housing and the optical fiber; and cooling the housing to allow the solder to form a hermetic compression seal between the housing and the optical fiber.

According to another broad aspect of the invention, there is provided a method for manufacturing low-temperature hermetically sealed optical fiber components. The method comprising the steps of: inserting an optical fiber into a housing, the optical fiber having a glass core, a glass cladding and a gold coating disposed around the core and cladding; placing a solder preform within the housing; heating the housing to a predetermined temperature, the predetermined temperature being below the melting temperature of the gold coating temperature and above a melting point of the solder preform, to allow the solder preform to form an eutectic and thereby fill a gap between the interior of the housing and the optical fiber; and cooling the housing to allow the solder preform to form a hermetic compression seal between the housing and the optical fiber and to form a chemical bond between the solder preform and the gold coating.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 2A:
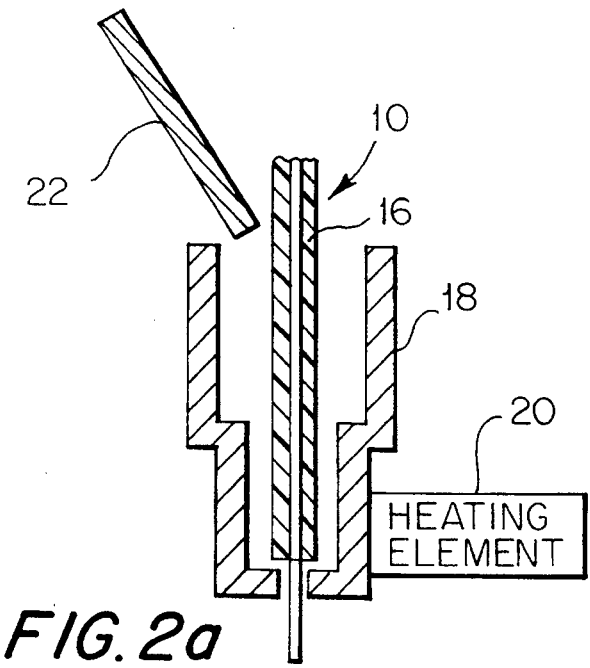
FIGS. 2a and 2b illustrate the steps associated with a preferred method of manufacturing low-temperature hermetically sealed optical fiber components.
Figure 2B:
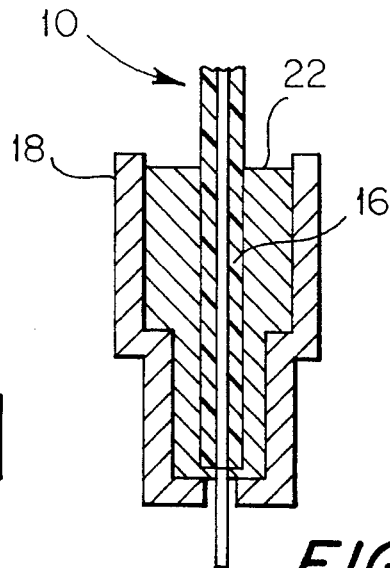

With reference to the Figures, wherein like reference characters indicate like elements throughout the several views and, in particular, with reference to FIGS. 2a and 2b, a preferred method for manufacturing low-temperature hermetically sealed optical fiber components is illustrated.

In this preferred method, a length of plastic-buffered glass fiber 10 having a core 12, cladding 14 and a plastic buffer 16 is positioned within a metal shell or housing 18 made of 303 stainless steel, as in FIG. 2a. Heat is applied only to housing 18 using a heating element 20 such as a small resistance welder which heats housing 18 directly using electrical resistance of housing 18. In a sense, metal housing 18 acts as an electrical element very much like heating coils in a toaster. This heating technique has the advantage that it is very quick, localized, and may be closely controlled. It should be appreciated that a resistance welder was utilized in this case, but any low-energy heating element 20 may be used, including a common furnace or even a propane torch. Once the temperature of housing 18 is above the melting temperature of a solder 22, solder 22 is melted by touching solder 22 to the inside of housing 18. This allows solder 22 to flow around optical fiber 10 and to form a seal between fiber 10 and housing 18.

The development of a low-temperature process for forming hermetic seals to plastic-buffered optical fibers 10 necessitates the use of a relatively low-temperature-melting materials or solders 22. Experiments have shown that a typical plastic buffer material 16 starts to burn off at a relatively low temperature of about 220° C. Therefore, glass sealing techniques, which require appreciably higher temperatures, cannot be used in forming seals directly with plastic-buffered fibers 10. It should be appreciated that it is vitally important to maintain the integrity of plastic buffer 16 as long as possible since fibers 10 are significantly weakened without such plastic buffers 16. In a preferred embodiment, a solder 22 comprising 63% tin/37% lead is utilized because it forms a eutectic at approximately 180° C. It should be appreciated that the particular solder 22 is unimportant so long as the temperature at which a eutectic is formed is below 220° C., i.e., the melting point of plastic buffer 16. Therefore, other solders such as indium/lead, indium/tin, tin/bismuth, indium/lead/silver, indium, and others may be used successfully in fabricating hermetic components.

It should be appreciated that the processing technique is dependent on the close control of processing temperature, i.e., high enough to insure complete solder 22 flow, but low enough not to burn or melt plastic buffer 16. Components have been fabricated using the above described technique, and helium leak tests on the parts have shown that they were hermetic, i.e., have a helium leak rate of less than $1 \times 10^{-8}$ cm$^3$/sec. It is suggested that solder 22 may form a chemical bond with plastic buffer 16, and also forms a compression seal that is hermetic.

Figure 3:
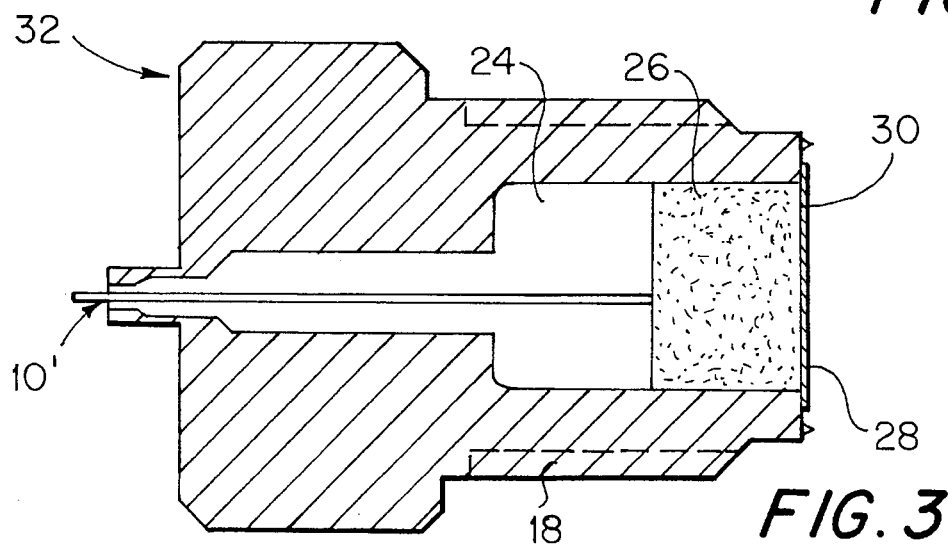
FIG. 3 illustrate the steps associated with an alternate method of manufacturing low-temperature hermetically sealed optical fiber components.

Turning now to FIG. 3, an example of a low-temperature-sealed hermetic component which was fabricated using a slightly different but related process is illustrated. This process differs from the one above in that a solder preform 24 is placed within housing 18 prior to heating. Upon heating in a furnace to approximately 200° C., solder preform 24 will melt around gold-coated fiber 10' and flow throughout the interior of housing 18. Depending on the solder preform 24 selected, a chemical bond will form between solder preform 24 and gold-coated optical fiber 10' since several metals, including tin and lead, form low-melting alloys with gold. It should be appreciated that gold melts at 1063° C. and therefore, the furnace should be maintained at a temperature below this temperature. This allows for a chemical bond to form between the gold coating and the solder preform 24. Components have been fabricated using this technique and they have been determined to be hermetic with helium leak rates of less than $1 \times 10^{-8}$ cm$^3$/sec.

The low-temperature-sealed component shown in FIG. 3 has been fabricated into a finished pyrotechnic actuator 32. The pyrotechnic 26 is maintained within housing 18 by a closure disk 28 which is in contact with an RTV pad 30 disposed between disk 28 and pyrotechnic 26. The low-temperature-sealed component shown in FIG. 3 has been successfully laser ignited and successfully withstood pressures in excess of 100,000 psi without failure. This proves that: the alternate fabrication process discussed above may result in super-high-strength optical fiber components, which greatly increases its potential applications. It should be appreciated that high-strength superalloys such as Inconel 718 may be utilized in constructing housing 18.

Figure 1:
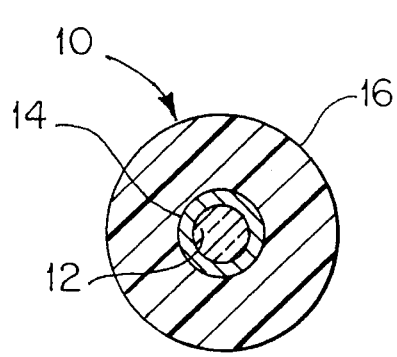
FIG. 1 illustrates a typical prior art plastic-buffered glass core/clad optical fiber.
Figure 4:
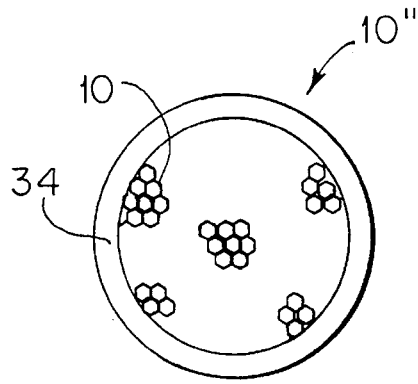
FIG. 4 illustrates a fused fiber array which may be utilized with the low-temperature hermetically sealed optical fiber component of FIG. 3.

FIG. 4 is an example of a fused fiber array 10" consisting of numerous standard optical fibers 10 which are fused together in to a bundle with in a glass sheathing or tube 34. The fused fiber array 10" typically are constructed from over one thousand individual 100 micron core diameter standard optical fibers 10 inside of glass sheathing or tube 34. During processing the tube 34 is heated and pulled down to a diameter of interest which is typically around 500 microns and may range from 200 to 1000 microns. During this pulling process, the diameter of each individual optical fibers 10 is reduced to approximately 10 microns and the optical fibers 10 are fused together to form a bundle. Low-temperature hermetically sealed components such as a pyrotechnic actuator 32, as depicted in FIG. 3, which utilizes a fused fiber array 10" in place of standard fiber 10 or fiber 10' have been fabricated.

The tremendous advantage of fused fiber arrays 10" in the application of low-temperature hermetically sealed components is centered on the ease of connecting these components to other components such as a laser. This is true since each of the individual optical fibers fused together in the bundle still acts as an optical waveguide. Pyrotechnic actuator 32, shown in FIG. 3, typically would be fabricated using a 100 micron core diameter optical fiber 10'. Making connections to actuator 32 is difficult due to dimensional concerns. For example, matching tolerances of +/−25 microns is not untypical in the fabrication of pieceparts. This means that when a connection is made to actuator 32, it is possible that there will be considerable misalignment resulting in a loss of signal.

This loss of signal, due to connection losses, is eliminated when components are fabricated using a fused fiber array 10" as illustrated in FIG. 4. Since the typical fused fiber array 10" acts as a waveguide, it may be many times greater in diameter, typically around 500 microns, than the diameter of the optical fiber in the connecting component, typically around 100 microns. This eliminates any signal losses which would be caused by small misalignments to the connecting component. In practice, this means that the laser needed to reliably ignite the fused fiber array component, i.e., actuator 32, may be made smaller and cheaper. In addition., fused fiber array components do not require close manufacturing tolerances which decrease their fabrication costs compared to standard single optical fiber components. This and other advantages greatly increase the application of fused fiber arrays components. Several hundred fused fiber components have been fabricated using solder preforms 24, fused fiber arrays 10", and Inconel 718 shells via the method described above. The components have been determined to be hermetic with helium leak rates of less than $1\times10^{-8}$ cm$^3$/sec. These fused fiber array components have been successfully laser ignited and successfully withstood pressure in excess of 100,000 psi without failure.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method for manufacturing low-temperature hermetically sealed optical fiber components, said method comprising the steps of:

inserting an optical fiber into a housing, said optical fiber having a glass core, a glass cladding and a protective buffer layer disposed around said core and cladding;

heating said housing to a predetermined temperature, said predetermined temperature being below a melting point for said protective buffer layer and above a melting point of a solder;

placing said solder in communication with said heated housing to allow said solder to form an eutectic and thereby fill a gap between the interior of said housing and said optical fiber; and cooling said housing to allow said solder to form a hermetic compression seal between said housing and said optical fiber.

2. The method recited in claim 1 wherein said predetermined temperature is below 220° C.

3. The method recited in claim 1 wherein said predetermined temperature is above 180° C.

4. The method recited in claim 1 wherein said solder is a 63% tin/37% lead solder.

5. The method recited in claim 1 wherein said solder is selected from the group consisting of: indium/lead, indium/tin, tin/bismuth, indium/lead/silver, and indium solders.

6. The method recited in claim 1 wherein said protective buffer is a plastic.

7. The method recited in claim 1 wherein said protective buffer contains gold.

8. A method for manufacturing low-temperature hermetically sealed optical fiber components, said method comprising the steps of:

inserting an optical fiber into a housing, said optical fiber having a glass core, a glass cladding and a gold coating: disposed around said core and cladding;

placing a solder preform within said housing;

heating said housing to a predetermined temperature, said predetermined temperature being below the melting temperature of said gold coating and above a melting temperature of said solder preform, to allow said solder preform to form an eutectic and thereby fill a gap between the interior of said housing and said optical fiber; and cooling said housing to allow said solder preform to form a hermetic chemical seal between said housing and said optical fiber and to form a chemical bond between said solder preform and said gold coating.

9. The method recited in claim 8 wherein said predetermined temperature is below 600° C.

10. The method recited in claim 8 wherein said predetermined temperature is above 180° C.

11. The method recited in claim 8 wherein said solder preform is a 63% tin/37% lead solder.

12. The method recited in claim 8 wherein said solder preform is selected from the group consisting of: indium/lead, indium/tin, tin/bismuth, indium/lead/silver, and indium solders.

13. The method recited in claim 8 wherein said housing is a high-strength superalloy.

14. The method recited in claim 13 wherein said high-strength superalloy is Inconel 718.

15. A high-strength laser ignited component which comprises:

a housing;

an optical fiber inserted into said housing, said optical fiber having a glass core, a glass cladding and a gold coating disposed around said core and cladding;

a solder preform disposed within said housing;

a hermetic chemical seal between said housing and said optical fiber; and a chemical bond between said solder preform and said gold coating;

wherein said hermetic seal and said chemical bond is formed by heating said housing to a predetermined temperature, said predetermined temperature being below the melting temperature of said gold coating and above a melting temperature of said solder preform, to allow said solder preform to form an eutectic and thereby fill a gap between the interior of said housing and said optical fiber, and cooling said housing to allow said solder preform to form a hermetic chemical seal between said housing and said optical fiber and to form a chemical bond between said solder preform and said gold coating.

16. The method recited in claim 1 wherein said optical fiber is fused fiber array, said fused fiber array comprising at least two optical fibers.

17. The method recited in claim 8 wherein said optical fiber is fused fiber array, said fused fiber array comprising at least two optical fibers.

18. The method recited in claim 15 wherein said optical fiber is fused fiber array, said fused fiber array comprising at least two optical fibers.

* * * * *